Aug. 25, 1931.   G. BETTINI   1,820,113
CAMERA
Filed July 28, 1927   6 Sheets-Sheet 1
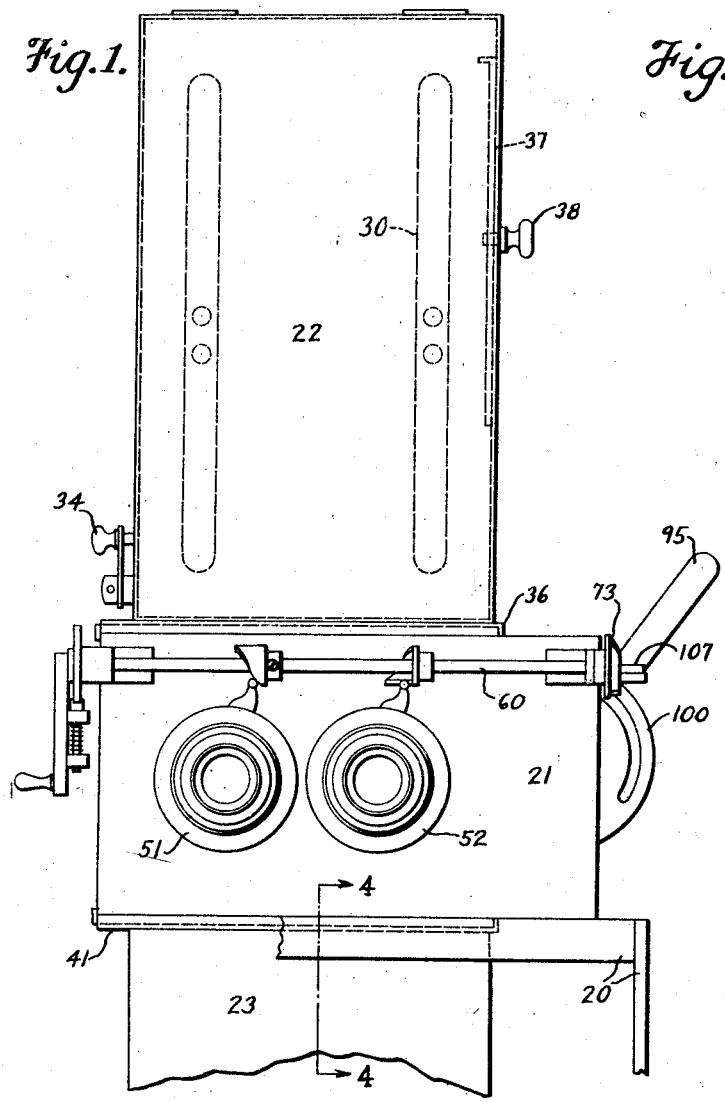
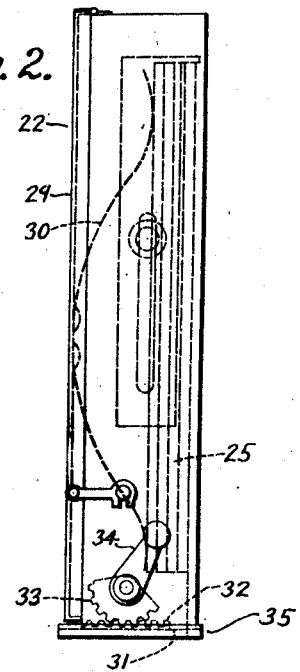
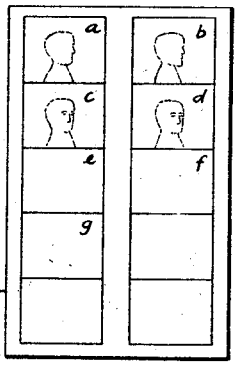
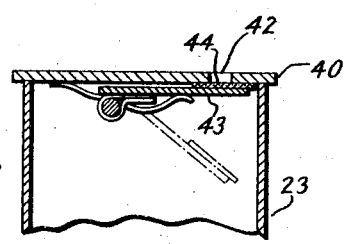
INVENTOR
Gianni Bettini
BY
Rogers, Kennedy &
Campbell, ATTORNEYS.

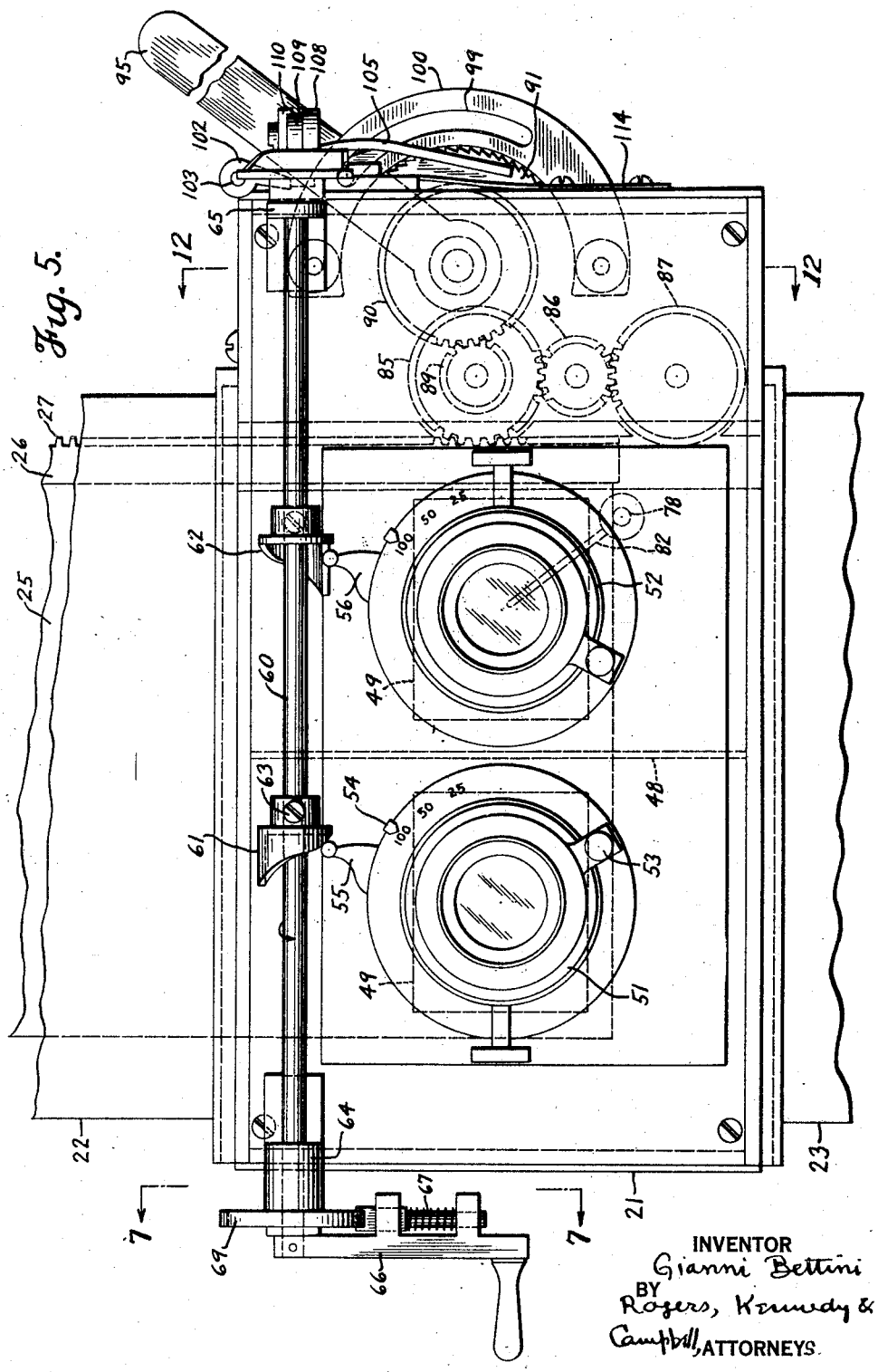

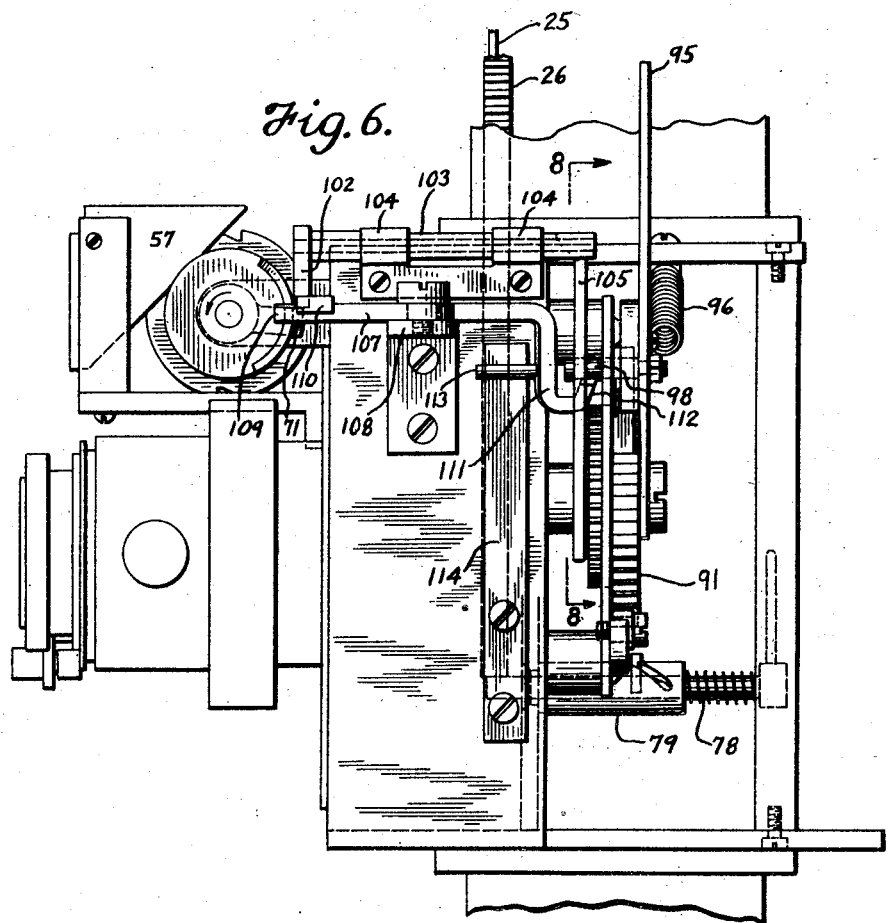

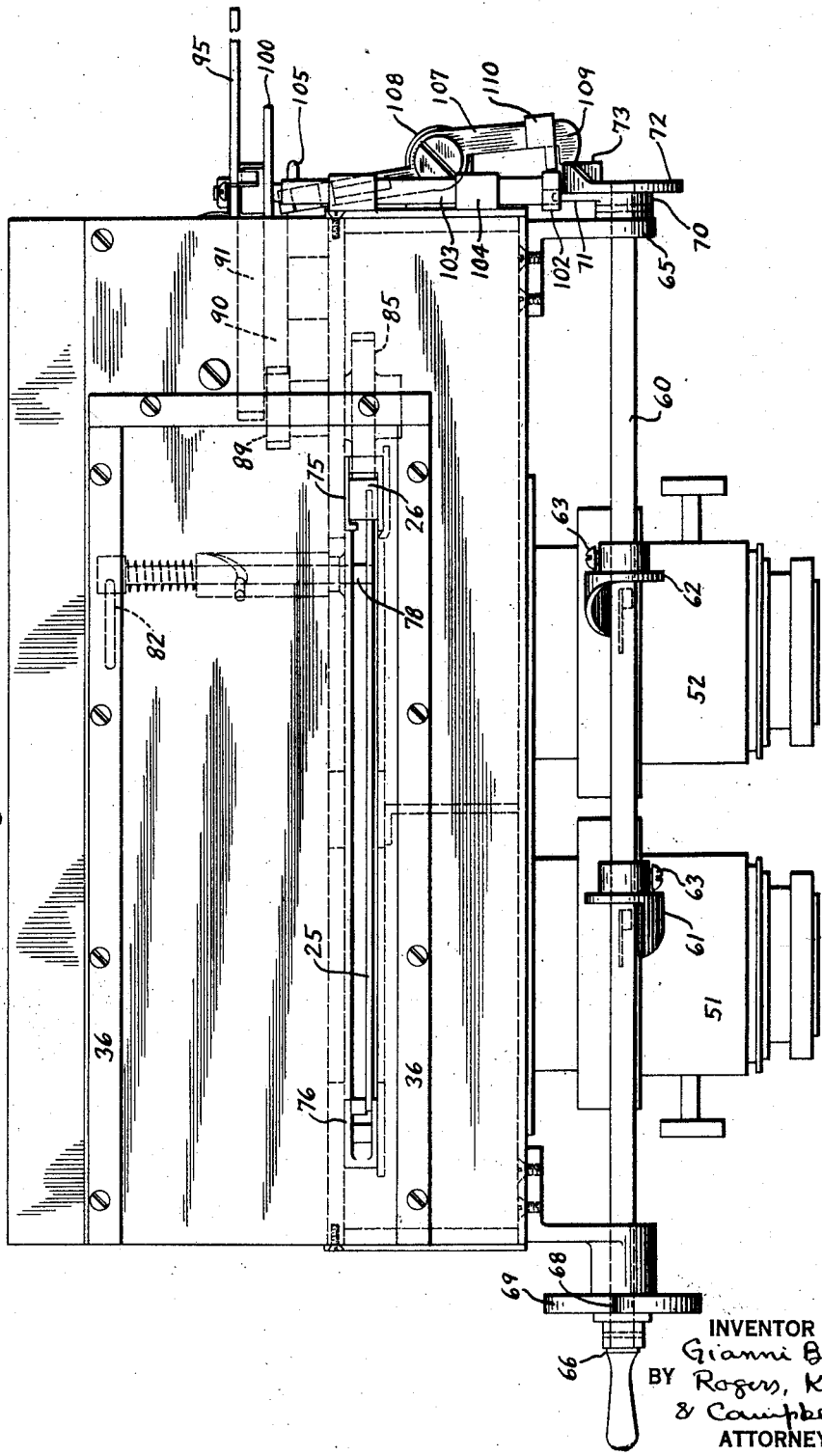

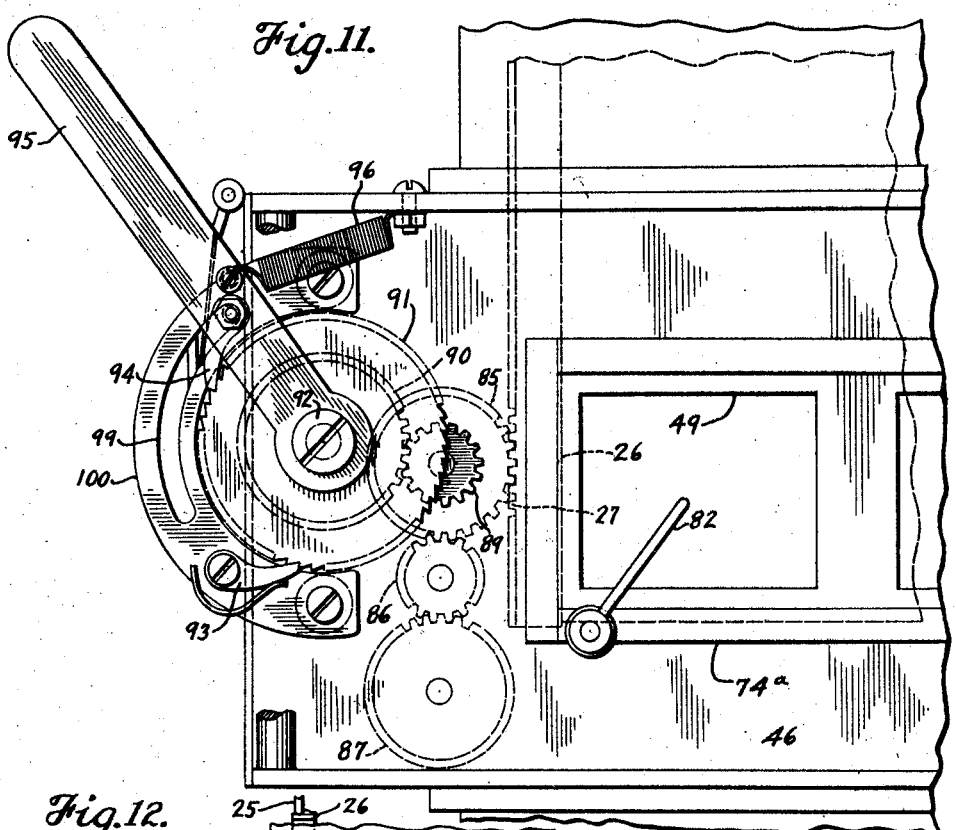
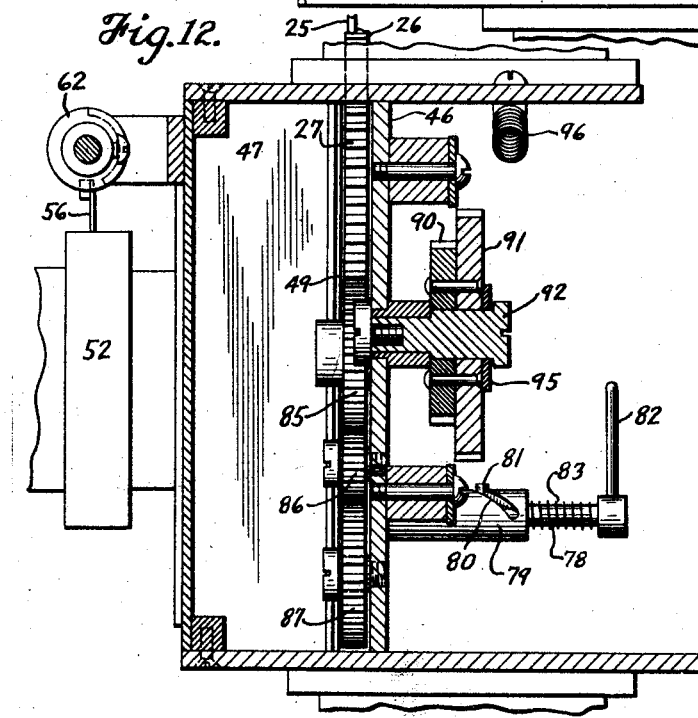

Patented Aug. 25, 1931

1,820,113

UNITED STATES PATENT OFFICE

GIANNI BETTINI, OF NEW YORK, N. Y.

CAMERA

Application filed July 28, 1927. Serial No. 209,047.

This invention is a novel camera and relates more especially to cameras operated mechanically for taking a series or plurality of pictures in succession.

The camera herein disclosed is especially intended and designed for taking relatively short successions or groups of exposures, for example for portrait work, whereby the operator in a single sitting may obtain, upon a single plate, film or carrier, a number of images of the person or subject, taken either while still or during motion, and with variations of expression or attitude, thus affording a variety of images from which a satisfactory selection may readily be made for enlargement or other purposes. The present system eliminates the objection to ordinary portrait photography that the sitter is required to assume a pose for each exposure, and for each plate, giving a forced expression, a natural pose being difficult under these conditions; and this invention readily affords the ability to secure exposures of natural and lifelike attitudes, poses and expressions, resulting in pleasing and characteristic portraits.

The general object of the present invention therefore is to afford a photographic camera adapted for the taking, in a convenient form and upon a single plate or carrier, of a series or group of exposures of a subject, whether or not in motion or undergoing natural changes of expression, pose or position.

A further object is to simplify the taking of portraits in group form, by providing for the making of the group of exposures on a plate or carrier, especially with a plurality of rows of exposures upon a separate plate.

A further object is to afford a photographic apparatus capable of producing upon a single plate or film a series or plurality of pairs of stereoscopic views or portraits, which may be developed either for separate use or for inspection in a stereoscope, the views taken either at still or in motion in which latter case the feeding and exposing mechanism might advantageously be modified for quicker sequence of exposure.

Other and further objects and advantages of the present invention will be pointed out in the hereinafter following description of one form or embodiment thereof or will be understood to those skilled in the subject. To the attainment of the objects and advantages referred to the present invention consists in the novel camera and the novel features of operation, combination, arrangement, mechanism and structure herein illustrated or described.

In the accompanying drawings Fig. 1 is a front elevation of a complete and assembled apparatus embodying my invention, with certain under parts broken off.

Fig. 2 is a left elevation of the plate supply magazine shown in Fig. 1, with interior parts in dotted lines.

Fig. 3 is a face view of the product, considered either as a glass plate negative or a positive print taken therefrom.

Fig. 4 is a vertical section taken on the plane 4—4 of Fig. 1, showing the structure of the receiving magazine.

Fig. 5 is a general front elevation on a larger scale than Fig. 1 showing the parts in their initial position, as in Fig. 1.

Fig. 6 is a general right elevation of the parts shown in Fig. 5.

Fig. 7 is a right elevation of a detail, partly in vertical section on the plane 7—7 of Fig. 5.

Fig. 8 is a front elevation partly in section on the line 8—8 of Fig. 6.

Fig. 9 is a top plan view of the shutter cams readjusted to act simultaneously for stereoscopic exposures.

Fig. 10 is a general top plan view of the parts shown in Fig. 5.

Fig. 11 is a rear elevation of the right hand portion of the camera showing particularly the feed mechanism.

Fig. 12 is a vertical section taken on the plane 12—12 of Fig. 5, looking from the right.

Figure 13:
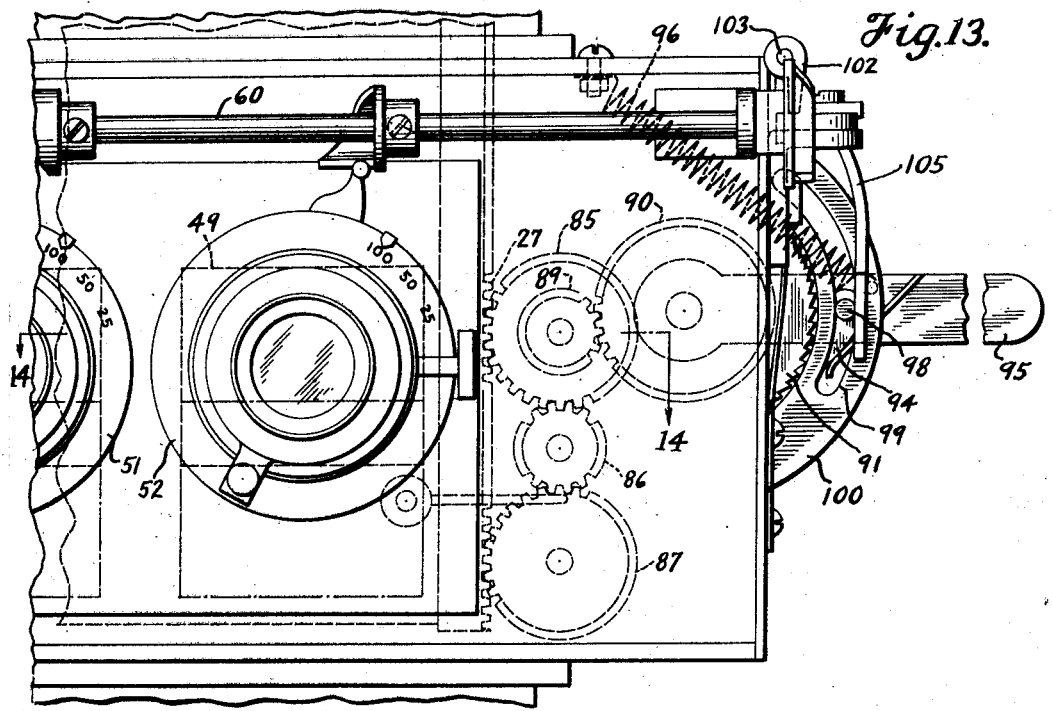
Fig. 13 is a view similar to Fig. 5 showing the parts in a different stage of position, with the picture plate lowered partially towards its position for the next picture, the feeding handle being part way down.

The camera is shown as supported on a table 20 and comprises a box-like structure 21 above which is removably mounted a supply magazine 22, with the receiving magazine 23 analogously mounted beneath the camera. The sensitive element may comprise a glass plate 25 or other carrier, containing a plurality of pairs or rows of image spaces, designated a and b, c and d, etc. in Fig. 3. The supply magazine 22 is arranged to hold a number of such plates, which are to be fed downwardly, and intermittently through the camera, and thence received in the lower magazine 23, each plate being previously provided at its longitudinal edge with a grooved metallic bar 26, provided with teeth 27 constituting a rack engageable with the feeding devices of the camera. Where using the terms "plate" it is intended to include any carrier of the sensitive emulsion, whether rigid, semi-rigid or flexible.

The supply magazine 22 may have an openable cover 29 for loading the magazine in a dark room. Attached to the cover are leaf springs 30 pressing forwardly on the inserted sensitive plates 25. The successive plates may be discharged downwardly through an exit or slot 31, which may be normally closed by a toothed slide 32 operated by a toothed sector 33 mounted on a shaft extending through the wall of the magazine, and provided with an exterior handle 34 whereby the magazine may be opened for downfeed of plates when attached to the camera. The enlarged base 35 of the magazine is arranged to slide into undercut guide bars 36 at the top side of the camera so as to position the slot 31 directly over the focal plane of the camera. The magazine may be provided with an interior pusher device 37 operable by an exterior knob 38 for forcing downwardly from the magazine into the camera the foremost of the sensitive plates. While the plates following the first plate might descend by their own weight, it is preferred that friction supports them until the knob is manually operated to start each plate, so that a single group of exposures can be made on one plate, which is then removed and developed separately.

The receiving magazine 23 is provided at its top end with an enlargement or flange 40 fitting into guideways 41 at the underside of the camera. The receiving magazine is shown as having an entrance slot 42 normally closed by a spring door 43 having a felt cover 44 to give a tight closure and prevent injury to the plates, this door closing automatically after the deposit of each plate in the magazine. It will be understood that the magazine is deep enough to receive a plurality of plates and provided with means for obtaining access for the removal of the plates in the dark room.

The camera structure comprises suitable front, side, top and bottom walls, and a rear wall 46. Extending centrally between the front and rear walls is a transverse partition wall 47 shutting off one side of the camera from the other and forming two separate chambers. The focal plane is immediately in front of the rear wall 46, and in front of the focal plane is a parallel wall 48 formed with apertures 49, preferably square in outline, and determining the shape of the exposed picture.

Left and right lenses 51 and 52 are shown mounted on the front wall in side by side position suitably spaced to give stereoscopic effects. Each lens may be separately focused by a lever 53, and may have a timing device 54, and a shutter operated by the throw of a lever 55 or 56. These devices are shown in Fig. 5, and the camera may have a finder 57 in the upper right hand corner as indicated in Fig. 6.

The general plan of operation is that the sensitive plate is moved down into position behind the lenses whereupon the shutter levers 55 and 56 are thrown, either successively or simultaneously, to make two exposures, the plate being then shifted downwardly by the height of a single picture, equal to the height of the aperture 49, and operations repeated. Herein the mechanisms for effecting the feeding of the successive plates from each exposure position to the next, and the mechanism for effecting the operation of the lenses, are so interrelated as to afford a highly efficient and convenient mechanical camera for the purposes stated, and one in which double exposures or skipped exposures are prevented.

Figure 14:
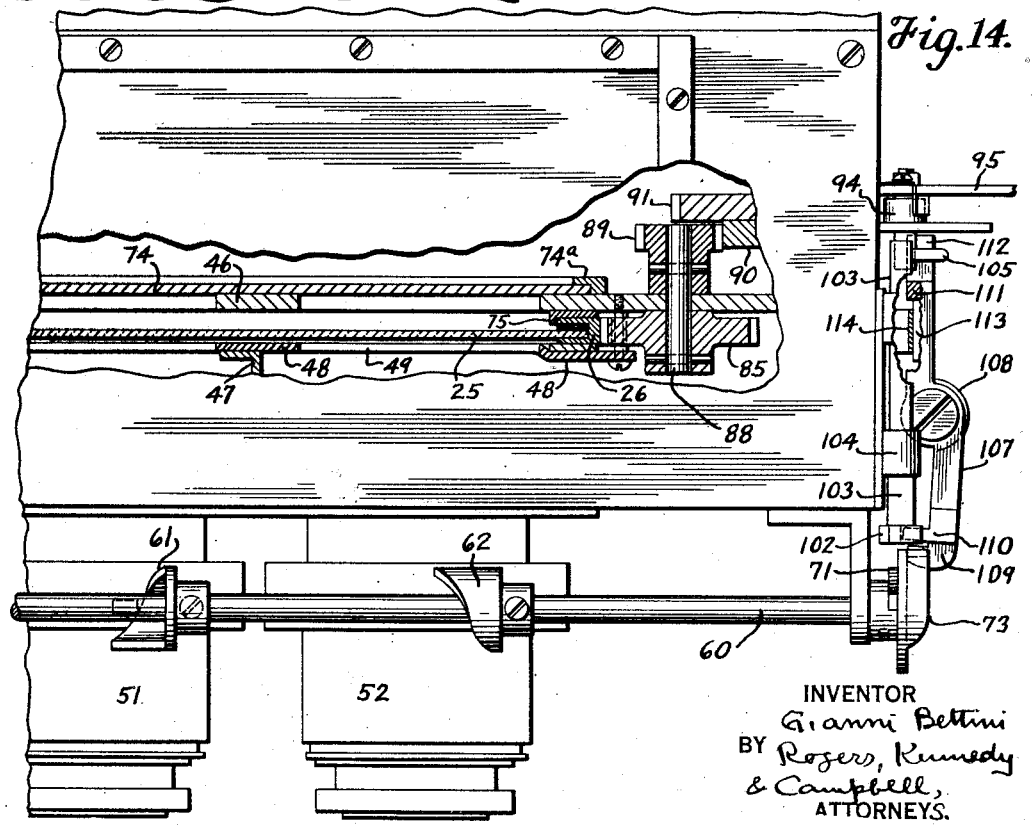
Fig. 14 is a top plan view partly in section on the line 14—14 of Fig. 13, but at a later stage of position, the lowering lever having returned upward to normal position, and the exposure of the shutters being in progress, the shutter cams being shown turned partially from normal.

Referring first to the shutter operating mechanism, this is preferably worked manually when used for portrait purposes, and comprises cam or similar actuating mechanism. A cam shaft 60 is shown carrying left and right cams 61 and 62 separately attached by screws 63 to the shaft so that the timing can be changed. As shown in the main figures the cams are timed to operate successively so as to produce different poses in each individual picture. In Fig. 9 however they have been readjusted to act simultaneously for the purpose of affording stereoscopic views. In either case each cam is so arranged as to operate upon the shutter lever 55 or 56 of the corresponding lens. Thus as seen in Figs. 1, 5, 10 and 13 the cam 61 is almost in position to operate the lever 55, whereas the cam 62 will not operate until substantially a half turn later of the shaft. Fig. 14 shows a different position, in which the shaft has made a half turn and the left lens is on the point of actuation.

The shutter actuating or exposing shaft 60 is shown mounted to rotate in a fixed left bearing 64 and right bearing 65 on the front wall of the camera. At the left extremity of the shaft, accessible to the right hand of the operator standing behind the machine, is the operating or exposing crank 66, a single turn of which will operate both shutters to make a pair of exposures on the sensitive plate. For convenience in indicating the position of the shaft, and to prevent rotation thereof in the wrong direction, the crank 66 is shown provided with a spring pressed pawl 67, the inclined upper end of which is arranged to engage corresponding notches 68 at the two opposite sides of a fixed disk 69 attached to the left bearing 64. By this arrangement the pawl drops into one or the other of the notches at each half turn, but not in a manner to prevent forward driving of the crank. The initial position of the crank is its downward position as seen in Figs. 1, 5, 7, etc., and the crank is supposed to be given a complete turn so as to make two exposures before the plate shifting or feeding mechanism moves the plate downwardly for another pair of exposures.

The shutter operating shaft 60, at its right hand end, is shown as formed with a collar 70 outside of the bearing 65. This collar has two elements formed with it, first a radial projection or stop dog 71, by which the manual rotation of the shaft 60 is caused to be stopped at the proper point, and a disk 72 formed with a rim cam 73 which controls the position of a swinging lever to be described, which controls the shaft stopping device and the operation of the plate feeding mechanism.

For initial focusing purposes the back wall 46 is shown in Fig. 14 as having a removable focusing slide 74 mounted upon it exterior to wall apertures which correspond with the positions of exposure of the two lenses. By removing the slide and inserting a ground glass in the camera the lenses may be accurately focused. The lenses however are intended to be of substantially universal focus so as to require no further adjustment.

The successive sensitive plates are preferably fed downwardly through the camera so that gravity will assist the feed. The top wall of the camera is slotted as shown in Fig. 10 to receive the sensitive plates 25 with their feed bars 26 from the top magazine. In passing through the camera the plates may be guided as follows. At the right hand edge the feed bars are shown as sliding downwardly through vertical guides 75, appearing in Figs. 10 and 14, while the left hand edge slides downwardly through a vertical guide 76. As already explained, the first or front plate in the top magazine is brought downwardly into the camera by the pusher 37. In order to position the plate in this downward movement there is herein provided a temporary stop rod 78 arranged to stand in the path of the descending plate so as to bring it to rest in position for the first exposure. This stop rod slides and rotates in a bearing sleeve 79 standing rearwardly from the rear wall 46 of the camera, as best shown in Figs. 6, 10 and 11. The sleeve is formed with a helical cam slot 80 in which travels a pin 81 projecting from the stop rod. The rod has a handle 82 at its rear end and a spring 83 pressing outwardly and tending to restore the parts. The stop rod 78 is shown in its forward position in Figs. 5, 6, 10, 11 and 12, and in this position it stands in the path of the descending plate so as to position it as described. In Fig. 13 the handle is shown swung outward and downward to retract the stop rod and permit the descent of the plates under normal operation.

The downward feeding movements of the sensitive plates are effected by a system of gears controlled by a feeding handle. Thus a gear 85 is shown with its teeth engaging the teeth 27 of the feed bar 26, the vertical guide 75 being cut away at this point to receive the gear. During the initial downward or setting movement of the plate and feed bar the teeth of the latter become engaged with the gear, which at this time is free to rotate. Thereafter the intermittent or successive downward movements of the plate are effected by the gear. Preferably, for steadiness of motion, two gears are arranged to engage the teeth or racks of the feed bars attached to the plates, and in this way there is always one gear at least engaging each feed bar. An idler pinion 86 is shown engaging the gear 85 and a lower gear 87 is driven by the pinion in the same direction as the gear 85, the lower gear engaging with the rack bar teeth in a similar manner, as is shown in Fig. 13.

The upper and lower feed gears 85 and 87 may be intermittently rotated through the following mechanism. The upper gear 85 is mounted on a shaft 88 which extends rearwardly to an exterior point, behind the back plate 46, where it is provided with a pinion 89 engaged and driven by a gear 90, these parts being well shown in Figs. 11 and 14. The gear 90 may be considered as a driving gear and itself receives motion through a ratchet wheel 91 to which the gear is attached, these two wheels being mounted loosely on a stud 92 projecting rearwardly from the wall 46. The ratchet is driven and controlled by a pair of spring pawls. Thus a stationary pawl 93 is shown which prevents reverse movement of the ratchet wheel and gear train, while a driving pawl 94 is shown, mounted on a lever 95 turning loosely on the same center or stud 92 that carries the ratchet wheel. The lever 95 is extended outwardly to constitute a handle by which the operation of the gear train may be effected and thus the feeding or lowering of the sensitive plates. A helical spring 96 is shown arranged to pull upwardly on the feed handle 95 restoring it to its normal inclined position, as shown in the several figures with the exception of Fig. 13 wherein the handle is in a partly lowered condition.

In each feeding operation the handle 95 is thrown downwardly through a fixed arc and allowed to return to normal position, this effecting a predetermined extent of feed corresponding with the vertical dimension or height of each image. For this purpose the handle 95 is shown as having a forwardly projecting stop pin 98 running in the curved slot 99 of a fixed plate 100 secured by screws and washers to the rear wall 46. It will be observed that the pawl and ratchet system operated by the feed lever 95 is such that the sensitive plates may be thrust downward freely during the initial setting thereof, the gear train and ratchet wheel turning during this operation. Thereafter the downward movements are effected through the ratchet system, aided by gravity, there being sufficient resistance and friction to the downward movement to prevent accidental displacement during operation. This constitutes a very simple and convenient means of effecting the intermittent feed of the sensitive plates. After each downward throw of the feed handle 95 the two lenses may be operated to effect the two exposures at that level, following which the lever may be thrown again to bring two more image spaces into position.

Thus far have been described the exposure operating mechanism and the plate feeding mechanism. It remains to describe the devices by which these two mechanisms coordinate so as to compel their cooperative action.

In order to stop the rotation of the exposing shaft 60 at the proper point following each operation there is provided a stop finger 102 adapted normally to stand in the path of the stop dog 71 on the shaft. Figs. 5 and 6 show the stop dog having come up in contact beneath the stop finger. The finger is swingingly mounted by being attached to a pivot shaft 103 extending rearwardly along the upper right hand corner of the camera box and supported in bearings 104 which gives sufficient friction to hold the shaft and finger in position. The rear end of the pivot shaft is provided with a downwardly extending arm or rod 105 which may be bent to the shape indicated so as to cooperate in the control actions. The bent arm 105 is arranged to cooperate with the pin 98 standing forwardly from the feed lever 95 in such manner that when the feed lever is thrown downwardly the pin presses outwardly on the arm, thus swinging it and removing the stop finger 102 from the path of the stop dog 71. The contrasting positions will appear clearly by comparing Fig. 5 with Fig. 13 in which latter the feed lever has been thrown partly down. In this way the operation of the feed lever to advance the sensitive plate effects the release of the exposure shaft so that it can be turned by its operating crank to effect the two exposures. In case it is desired to release the shaft without feeding the plate the bent arm 105 may be swung outwardly by hand, thus to shift the stop finger 102. The stop finger could be restored to stopping position in the same manner, but as will be explained, is preferably automatically restored through the operation of the exposing shaft itself.

The remaining coordinating element comprises a control lever or cam lever 107 mounted in a bearing 108 somewhat below the lever of the pivot shaft of the stop finger. This control lever takes part in several functions. At its front end it carries an enlargement or lug 109 bearing on the rim cam 73 of the exposing shaft, and constituting a follower, so that the cam normally holds the forward end of the control lever to the right, subsequently releasing it to spring to the left and finally throwing it again to the right. To the rear of the follower 109 the control lever carries a contact 110. This is arranged in the path of the stop finger 102 so that when swung to the left it moves the stop finger into normal position to obstruct excess rotation of the exposing shaft. The control lever is extended rearwardly of its fulcrum to where it drops at 111 to a lower level, thence extending again rearwardly and formed into a guard 112 normally inoperative as shown in Fig. 10, but adapted to be swung outwardly into the path of the pin 98 of the feed handle 95, at such times preventing the operation of the feed handle, namely during the exposing operations. The portion 111 of the control lever has an outstanding pin 113 pressed outwardly or rightwardly by a plate spring 114, which thus opposes the cam 73 and holds the follower 109 in contact with the cam.

The cooperation of the described parts may be explained by stating the preferred general operation of the apparatus. Initially the parts will be in a position as shown in Figs. 1 to 12. The plate stop rod 78 is adjusted forwardly in the path of the plate as the latter is pulled down manually into the camera, and stops the plate in position for the first exposure. The stop rod will then be thrown rearwardly by swinging its handle over to the right and down as shown in Fig. 13. The camera is now in readiness for a pair of exposures, assuming that the stop finger 102 has previously been thrown outwardly from the path of the stop dog 71, either by the throw of the feed handle 95 or the manual swing of the bent arm 105. The operator then, by the exposing crank 66, turns the exposing shaft 60. The complete turn of the shaft makes both exposures at the first or lowest level of the sensitive plate, either in succession or simultaneously. The rotation of the shaft also performs certain other operations. The cam 73, after something less than a quarter revolution, passes beyond the follower 109 so that the follower is sprung inwardly to the left by the pressure of the spring 114 upon the control lever or cam lever 107. This position of parts is as shown in Fig. 14. This quick movement of the control lever effects two purposes. Firstly, it throws the stop finger back to the left in the path of the stop dog so as to render it operative to stop the exposing shaft at the end of the current rotation. At the same time the rear lower extremity of the control lever, which is now shifted under the pin 98 of the feed lever operates as a guard and prevents depression of the feed lever, so that a new feeding operation can not be performed until the exposing operation has been completed. The exposing shaft continues its rotation, and slightly before the completion thereof, after the exposures have been made, the cam 73 again forces outwardly to the right the follower 109, thus swinging the control lever 107 back into normal position. The guarding portion 112 swings away from the feed lever pin and leaves the latter free to be operated, while the contact 110 withdraws from the stop finger, leaving the latter however in its operative position. At the end of the rotation the stop dog comes up in contact with the stop finger, preventing further forward rotation, while the spring pawl 67 on the exposing crank snaps up into the lower notch 68 of the fixed disk 69, thus preventing reverse rotation, and holding the crank and shaft against any rotation. The left hand of the operator thereupon swings down the feed lever 95, through the position shown in Fig. 13 and to its lowermost position as determined by the movement of the pin 98 in the slot 99. This operates through the pawl 94 and ratchet 91 to rotate the gear train and move down the sensitive plate one row. During its descent the feed handle pin swings outwardly the bent rod 105, as seen in Fig. 13, thus removing the stop finger from the path of the stop dog. Upon release the feed lever springs back to its topmost position and the exposing crank is in readiness for another rotation and two exposures at the second level.

When the exposures are successive rather than simultaneous, the operator can readily effect a halfway pause in the rotation of the crank so as to take only one of the two exposures, and follow this up with the other when ready. Thus a highly convenient apparatus is provided for taking a plurality of rows of exposures, with a plurality of exposures in each row, with the minimum amount of trouble and complication and the maximum convenience and efficiency.

The invention includes not only the camera and mechanism described, but the novel product thereof and the method followed.

There have thus been described a camera and a system of photography embodying the principles and attaining the advantages of the present invention. Since various matters of operation, combination, arrangement, mechanism and structure may be modified without departing from the principles involved, the invention is not intended to be limited to such matters except so far as set forth in the appended claims.

What is claimed is:

1. A photographic exposing camera comprising guide means for a sensitized plate or carrier having successive pairs of image spaces, transversely spaced lenses, a single exposing mechanism for operating both lenses simultaneously, and a longitudinal feeding mechanism for advancing the plate progressively from row to row in a direction perpendicular to a plane extending through the axes of both lenses, whereby a series of successive pairs of stereoscopic images are produced, substantially as described.

2. A photographic exposing camera comprising guide means for a sensitized plate having successive rows of image spaces, transversely spaced lenses with shutters, a single exposing mechanism for operating said shutters, and a longitudinal feeding mechanism for advancing the plate progressively from row to row in a direction perpendicular to the common plane of the axes of the lenses, and actuating means for the feeding mechanism and the exposing mechanism, with means so inter-connecting said mechanisms that they can be actuated only in alternation with each other.

3. A camera as in claim 2 and wherein the exposing mechanism is adjustable in timing to effect selective exposures either successive or simultaneous at each row.

4. A camera as in claim 2 and wherein the feed mechanism comprises a toothed wheel adapted to advance a succession of plates having feed teeth along an edge, and the camera has a detachable supply magazine above, with feed slot, an interior gate for such slot, an exterior handle for opening the gate, and a receiving magazine below the camera.

5. A camera as in claim 2 and wherein the exposing mechanism comprises shutter levers for the lenses, a rotary shaft carrying separate cams for the shutter levers, a crank for turning the shaft, and a device preventing reverse turning thereof.

6. A photographic exposing camera comprising means for guiding a sensitized plate having successive rows of image spaces, transversely spaced lenses with shutters, a single manually-controlled exposing mechanism for operating said shutters, a manually-controlled feeding mechanism for advancing the plate intermittently from row to row in a direction perpendicular to the common axis of the lenses, and with intermediate pauses, the exposing mechanism being operable during the pauses of the feeding mechanism, and interconnecting means requiring the manual operations of the exposing and feeding mechanisms to be effected alternately in definite sequence.

7. A camera as in claim 6, wherein the manually-controlled exposing mechanism includes adjusting means whereby the shutters may be selectively operated either successively or simultaneously at each row of image spaces on the plate.

8. A camera as in claim 6 wherein said interconnecting means comprises a cam which is rotatable with the exposing mechanism, a lever pivoted intermediate its ends between said cam and the feeding mechanism, said lever being adjustable so that one of its ends swings into and out of the path of a shoulder on said cam respectively to prevent or to permit rotation of the cam, and the other end of said lever constituting a guard which is movable respectively out of and into the path of movement of a projection of the feeding mechanism, an adjustable stop adapted to engage a portion of said lever to shift it out of the path of said cam, and a member engageable by said projection to actuate said stop when the feeding mechanism is operated.

9. A camera as in claim 2 and wherein the feeding mechanism is held inoperative at each row while all the exposures at such row are made, and wherein the exposing mechanism effects successive operation of the shutters at each row while said feeding mechanism is so held inoperative.

10. A camera as in claim 2 and wherein the feeding mechanism comprises teeth along an edge of the plate, a gear engaging the teeth, a ratchet turning the gear, a second gear also engaging the teeth at a different point, and a gear between said gears, and a handle with pawl for turning the ratchet whereby to actuate the feeding mechanism independently of the exposing mechanism.

In testimony whereof I have affixed my signature hereunto.

GIANNI BETTINI.

CERTIFICATE OF CORRECTION.

Patent No. 1,820,113.  Granted August 25, 1931, to

GIANNI BETTINI.

It is hereby certified that error appears in the printed specification of the above numbered patent requiring correction as follows: Page 6, after line 74, insert the following as claim 11:

11. A camera as in claim 2 and wherein the feeding mechanism comprises teeth along an edge of the plate, a gear engaging the teeth, a ratchet turning the gear, and a handle with pawl for turning the ratchet, whereby to actuate the feeding mechanism independently of the exposing mechanism.

and that the said Letters Patent should be read with this correction therein that the same may conform to the record of the case in the Patent Office.
Signed and sealed this 8th day of December, A. D. 1931.

(Seal)

M. J. Moore,
Acting Commissioner of Patents.